United States Patent [19]

Keane et al.

[11] 4,156,875
[45] May 29, 1979

[54] RANGE GATE GENERATOR WITH VELOCITY AIDING

[75] Inventors: Philip A. Keane, North Reading, Mass.; Arthur J. Torino, Jr., Merrimack, N.H.

[73] Assignee: Raytheon Company, Lexington, Mass.

[21] Appl. No.: 885,826

[22] Filed: Mar. 13, 1978

[51] Int. Cl.² .......................... G01S 9/08; F41G 7/00
[52] U.S. Cl. .................................... 343/7.3; 244/3.19
[58] Field of Search ........................ 343/7.3; 244/3.19

[56] References Cited

U.S. PATENT DOCUMENTS

| | | | |
|---|---|---|---|
| 3,875,391 | 4/1975 | Shapiro et al. | 364/200 X |
| 4,037,202 | 7/1977 | Terzian | 244/3.11 |
| 4,063,238 | 12/1977 | Conner | 343/7.3 |

Primary Examiner—Maynard R. Wilbur
Assistant Examiner—Richard E. Berger
Attorney, Agent, or Firm—Philip J. McFarland; Joseph D. Pannone

[57] ABSTRACT

Apparatus and method for controlling the operation of a range gate generator used in a pulse radar is shown. In accordance with the disclosure, the position of the range gate, or gates, out of the range gate generator is controlled from pulse to pulse primarily in accordance with the Doppler velocity of a selected target and the pulse repetition interval of the pulse radar with a periodic correction in accordance with the range of such target.

7 Claims, 11 Drawing Figures

RANGE GATE GENERATOR WITH VELOCITY AIDING

BACKGROUND OF THE INVENTION

This invention pertains generally to pulse Doppler tracking systems and particularly to an improved range gate generator for use in such a system to position a range gate around echo signals from a moving target.

As is well known, the round trip time for a radar pulse to travel to and from a target is a function of the range between a radar and the target. If the target is approaching or moving away from the radar, i.e. if a so-called Doppler velocity (or acceleration) is experienced, then the range between the target and the radar continually changes and a concomitant change in the time of arrival of echo signals from the target is experienced. The magnitude of such change in the time of arrival is of particular importance when the radar is a pulse radar installed on a guided missile and a range gating technique is used to reduce the effects of interfering signals, such as those from clutter. Thus, for example, if the Doppler velocity between a guided missile carrying an active seeker and a target were on the order of, say, 2300 meters per second, the range between the two would decrease by approximately 91 meters in each successive interval of approximately 40 milliseconds (a typical interval between successive updates of the contents of a computer). A change in range of such magnitude corresponds to a change in the round trip time in the order of 300 nanoseconds. With a typical width of 160 nanoseconds for the range gate it would be possible for the echo signal from the target to move out of the range gate, resulting in the loss of the echo signal. To avoid loss of the echo signal, the interval between successive updates of the position of the range gate could be shortened or the interval in which the range gate is opened could be lengthened. Neither expedient is, however, desirable for reasons obvious to one of skill in the art. It remains, therefore, to adapt the technique referred to in the art as "velocity aiding" to allow the proper positioning of a range gate in accordance with the Doppler velocity between a target and a guided missile. In carrying out the velocity aiding technique the Doppler velocity is measured or estimated and then the position of the range gate is adjusted in accordance with such velocity so that a desired echo signal may be caused always to fall within a relatively narrow range gate.

Unfortunately, known ways of implementing the velocity aiding technique are, however, not particularly well suited for use where there exists severe restrictions on size and complexity as, for example, in guided missiles. Thus, one known arrangement for implementing velocity aiding involves the use of a tapped delay line wherein discrete delay intervals, each separated by a desired velocity aiding increment, are produced at the taps on such line. The amount of velocity aiding, i.e. the change in the position of the range gate, then is determined by the particular tap selected. The delay line (which is an analog device) and the requisite control circuitry to obtain satisfactory operation under any condition experienced in practice combine to make such an implementation infeasible, by reason of physical size alone, for use in a guided missile.

Another known velocity aiding technique involves the use of two integrators. One of the integrators generates a sawtooth waveform at the pulse repetition interval (PRI) of the radar and the second one of the integrators generates a ramp waveform whose slope depends on the Doppler velocity. The sawtooth waveform and the ramp waveform are applied to a differential amplifier with the result that when the voltage of the former exceeds the voltage of the latter an output is produced by the differential amplifier to trigger a fixed pulsewidth unistable multivibrator. The output of such multivibrator then is the basic waveform for generating the range gate during each PRI. As the slope of the ramp waveform is changed to correspond with different Doppler velocities the instant at which the fixed pulsewidth unistable multivibrator is triggered is similarly changed to effect velocity aiding. As with the implementation using a tapped delay line, the physical size and complexity of the elements making up this implementation militate against its use in a guided missile. In particular, if the change in position of the range gate is to be linearly related to Doppler velocity, the sizes of the capacitors in the integrators are excessive.

Another difficulty with each one of the various known techniques for velocity aiding is that system flexibility may be attained only at the price of complexity. That is to say, if the velocity aiding arrangement is to be usable in a pulse radar whose pulse repetition interval may be changed or if the number of velocity aiding increments (sometimes referred to as "range gate slips") is to be changeable, the complexity of the requisite velocity aiding arrangement is excessively high.

SUMMARY OF THE INVENTION

With this background of the invention in mind, it is an object of this invention to provide a range gate generator which is adapted to implementation by hybrid integrated circuits and which incorporates velocity aiding to position a range gate around a moving target.

Another object of this invention is to provide a range gate generator incorporating velocity aiding, such generator providing a large number of range gate slips of differing sizes to allow the pulse repetition interval of a radar to be varied without adding to the complexity of such generator.

These and other objects of the invention are generally attained by providing a range gate generator which is responsive to binary words from a digital computer, such words being representative of the initial range to the target, the missile-to-target closing velocity and whether the target is approaching or receding. The word representative of initial range is applied to a cyclic counter which controls a range gate generator to initially position the range gate. The output of the cyclic counter is also passed to a synchronizer. A second input to the synchronizer is obtained from a time mark counter which continuously counts out the word representing the missile-to-target closing velocity. The function of the synchronizer is to synchronize the time mark counter output pulse to the system PRI at the completion of a velocity aiding estimate time interval. Before the end of such interval the output of the cyclic counter has a period equal to the PRI. When the synchronizer is actuated a word representative of PRI−20 nanoseconds or PRI+20 nanoseconds, depending upon whether the target is approaching or receding, is loaded into the cyclic counter so that the output of that element occurs at a period of PRI−20 nanoseconds or PRI+20 nanoseconds to effect the requisite range gate slip.

BRIEF DESCRIPTION OF THE DRAWINGS

Other objects and many of the attendant advantages of the invention will be readily appreciated as the same become better understood by reference to the folflowing detailed description when considered in connection with the accompanying drawings wherein.

DESCRIPTION OF THE PREFERRED EMBODIMENT

Before referring to the FIGURES it will be noted that only those portions of the circuitry on a guided missile necessary to an understanding of the contemplated invention are indicated. For that reason also the various elements which are indicated in the FIGURES which are known in the art are simply shown in block form, it being deemed sufficiently instructive to a person of ordinary skill in the art to reproduce the preferred embodiment of the invention.

Figure 1:
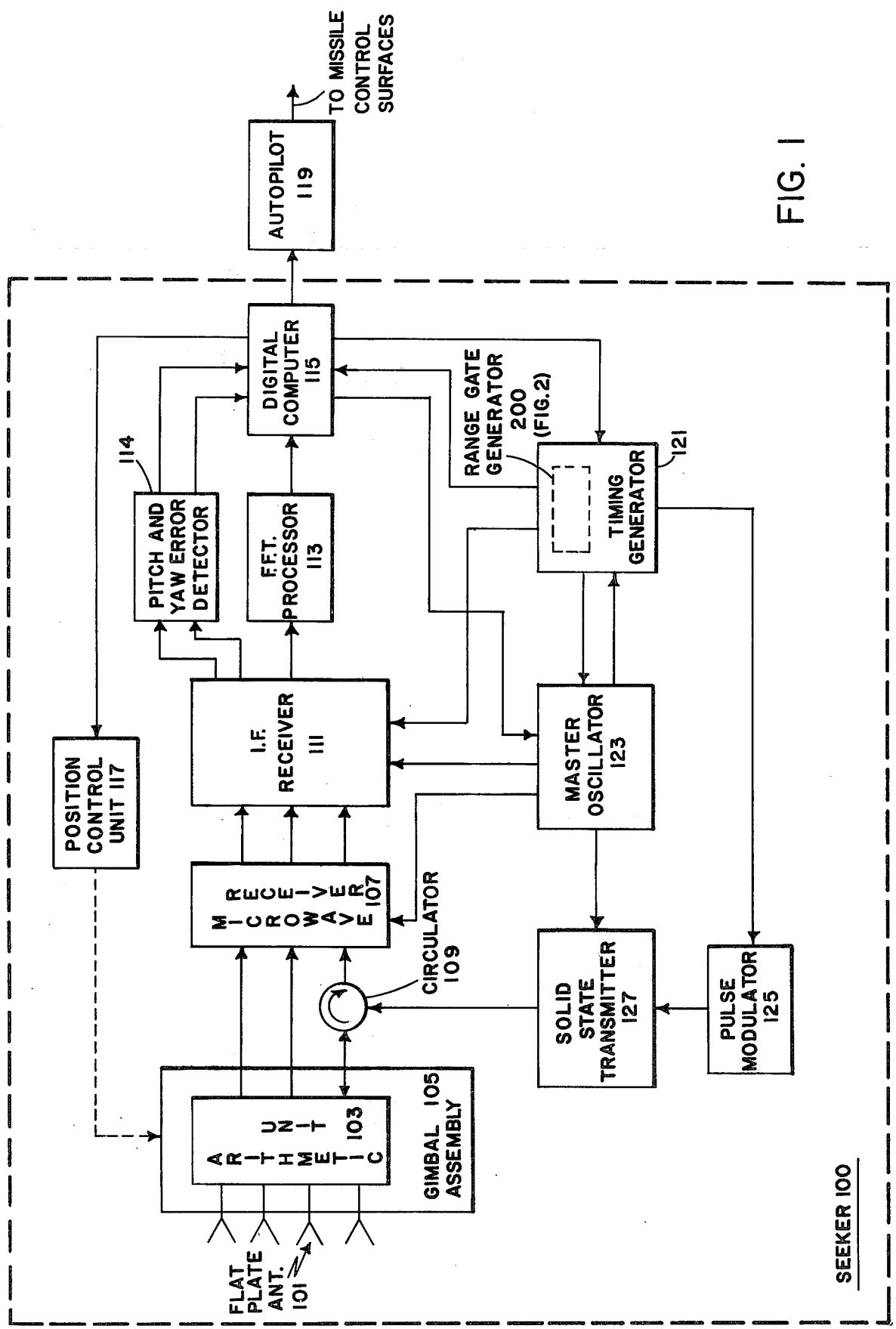
FIG. 1 is a simplified block diagram of an active missile seeker wherein the contemplated range gate generator is utilized to center a range gate about the returns from a moving target.

Referring now to FIG. 1, a seeker 100 employing a range gate generator 200 with a velocity aiding arrangement (illustrated in FIG. 2) to ensure that echo signals from a target (not shown) are effectively centered within a gate is shown. The seeker 100 includes a flat plate antenna 101 and a monopulse arithmetic unit 103 mounted on gimbal assembly 105. The arithmetic unit 103 is operative to produce, in a conventional manner, monopulse pitch and yaw error signals and a monopulse sum signal. Such signals are passed, via rotary joints (not shown), directly to a microwave receiver 107 (the monopulse sum signal also being passed as shown through a circulator 109). The microwave receiver 107 is effective to amplify and downconvert the monopulse sum and error signals to signals at a first intermediate frequency (IF), here 314.6 MHz. The IF signals are passed to an IF receiver 111 in which the functions of automatic gain control (AGC), down-conversion to a second intermediate frequency (here 31 MHz), range gating, filtering, multiplexing and a final conversion of the monopulse sum signals at the second I.F. to baseband signals (which are bipolar video in-phase (I) and quadrature phase (Q) signals). The gated monopulse sum baseband signals are passed to a Fast Fourier Transform (FFT) signal processor 113. The latter, which includes the requisite analog-to-digital converters (not shown), is of conventional design and may, for example, be similar to that described in U.S. Pat. No. 3,875,391 issued Apr. 1, 1975 to inventors Shapiro et al and assigned to the same assignee as the present invention. The output of the FFT signal processor 113 (which is the frequency spectrum of the range gated monopulse sum signal) is, in turn, passed to a digital computer 115. In addition, the gated monopulse pitch and yaw error signals are demodulated finally in a pitch and yaw error detector 114 and passed to the digital computer 115 (which may be similar to that described in U.S. Pat. No. 4,037,202 issued July 19, 1977 to inventor John Terzian and assigned to the same assignee as the present invention. The digital computer 115 then provides target bearing information to a position control unit 117 and to an autopilot 119. The former is adapted to position the gimbal assembly 105 and the autopilot 119 is adapted to develop control signals for the missile wings (not shown). The digital computer 115 also supplies control signals to a timing generator 121 which includes the range gate generator 200 (with a velocity aiding arrangement to be described in detail hereinbelow with reference to FIG. 2) for, inter alia, controlling the range gate (not shown) within the I.F. receiver 111. The digital computer 115 is also effective to control a master oscillator 123 to close the tracking loop. Completing the seeker 100 are a pulse modulator 125 and a solid state transmitter 127 which are arranged to provide the transmitted pulse train.

Figure 2:
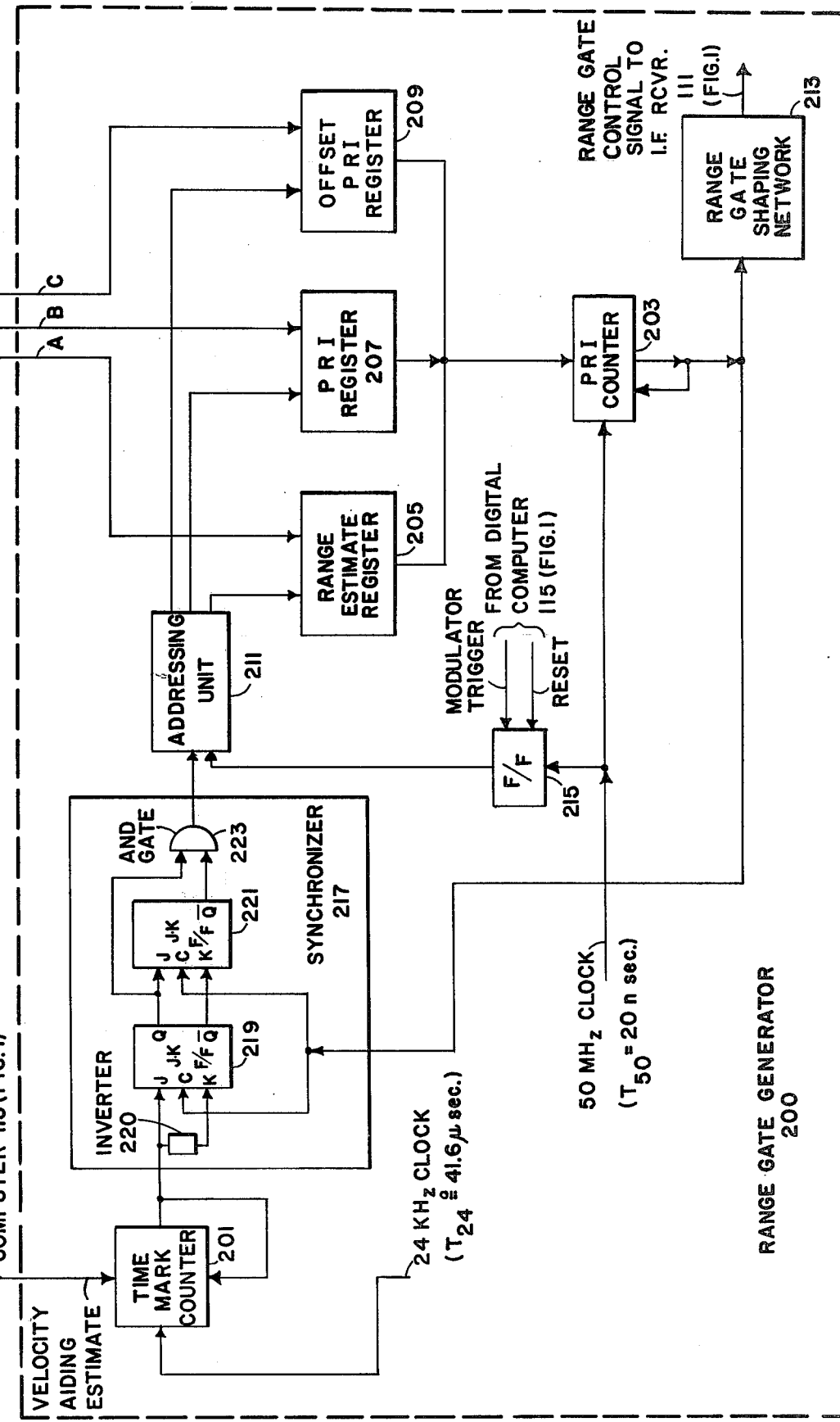
FIG. 2 is a simplified block diagram of a range gate generator to produce velocity aiding according to the invention.
Figure 3:
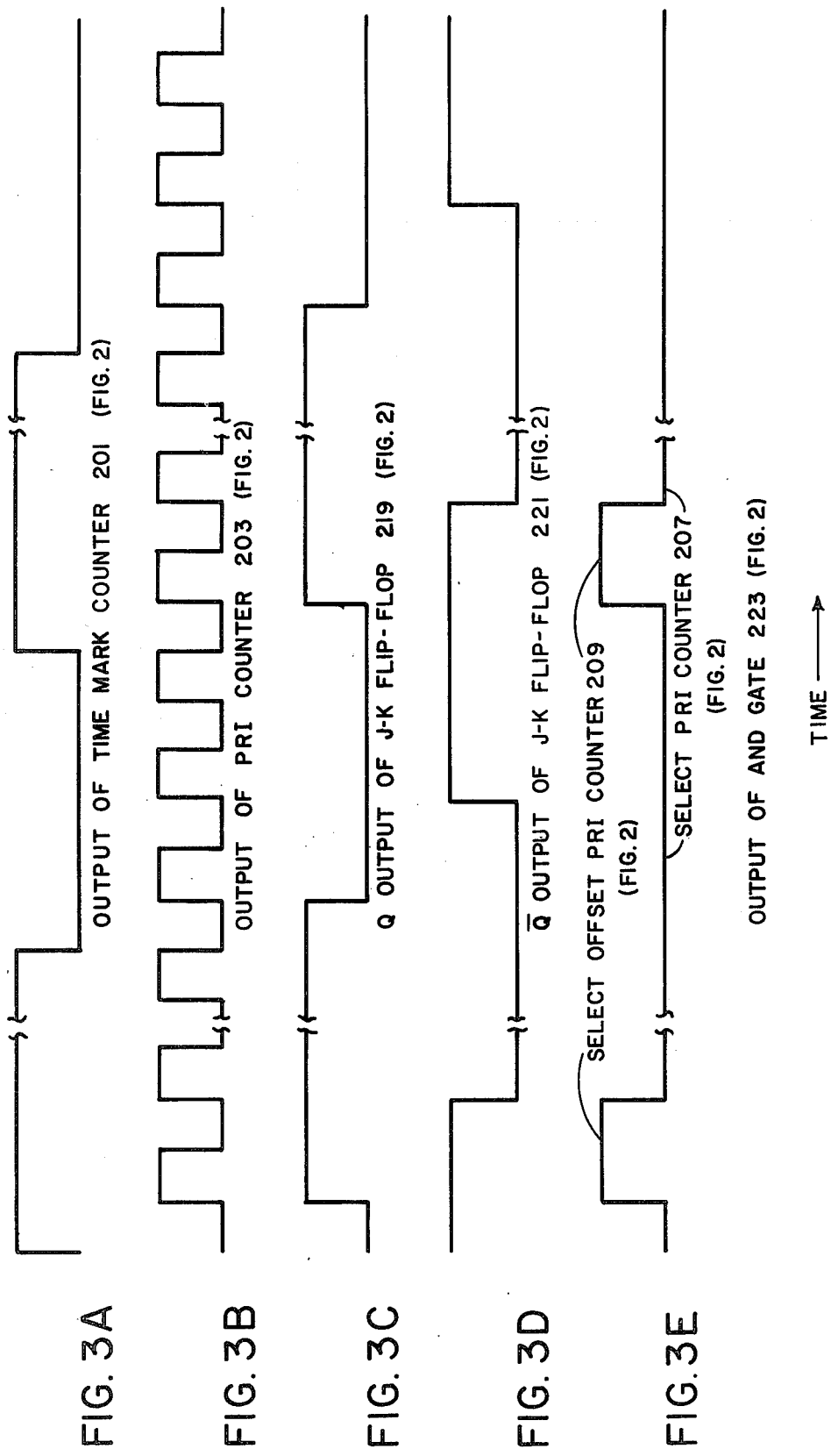
FIGS. 3A through 3E constitute a series of timing diagrams useful in understanding the operation of the range gate generator of FIG. 2.

Referring now to FIGS. 2 and 3A through 3E the range gate generator 200 of the timing generator 121 (FIG. 1) is shown to include a time mark counter 201 and a PRI counter 203. The former, which here is clocked at a 24 KHz rate provided by a clock (not shown) in the timing generator 121 (FIG. 1), is shown to receive a VELOCITY AIDING ESTIMATE word, which is a binary word representative of the missile-to-target closing velocity, from the digital computer 115 (FIG. 1). The time mark counter 201 counts out this word providing an output having a pulse width of 41.6 microseconds and a period equal to the VELOCITY AIDING ESTIMATE, as shown in FIG. 3A. The PRI counter 203 is shown to receive as a data input the output of a range estimate register 205, a PRI register 207, or an offset PRI register 209. Each one of the just-mentioned registers is shown to be controlled by an addressing unit 211 which allows data from the digital computer 115 to be extracted from a selected one of such registers. It is noted here in passing that each of the registers 205, 207 and 209 is a tri-state storage register such as the Model 25LS2520 from Advanced Microdevices Inc., 901 Thompson Place, Sunnyvale, Calif. Thus, the outputs from such devices may be combined as shown. The range estimate register 205 contains a RANGE ESTIMATE word provided on a line marked "A" by the digital computer 115 (FIG. 1) which is an estimate of the initial range to the target. Such word, when applied to a range gate shaping network 213, initially positions the range gate (not shown) in the I.F. receiver 111 (FIG. 1). The PRI register 207 receives, on a line marked "B", a binary word from the digital computer 115 (FIG. 1) representing the selected system PRI. A binary word provided by the digital computer 115 (FIG. 1) on a line marked "C" to the offset PRI register 209 indicates whether the target is approaching or receding. Thus, if the target is approaching a binary word representing the PRI minus 20 nonoseconds is provided, and, conversely, if the target is receding a binary word representing the PRI plus 20 nanoseconds is provided.

The addressing unit 211, which is a conventional decoder to provide an enable signal on any one of three output lines, is shown to receive a first control signal from a flip/flop 215 (F/F 215) and a second control signal from a synchronizer 217. The former, which is clocked at a 50 MHz rate, is a self-latching device and is triggered by a MODULATOR TRIGGER signal provided by the digital computer 115 (FIG. 1). Upon receipt of the MODULATOR TRIGGER signal, the flip-flop 215 provides a control signal to the addressing unit 211 which, in turn, provides an ENABLE signal to the range estimate register 205. The latter, when enabled, causes the RANGE ESTIMATE word to be passed, via the PRI counter 203, to the range gate shaping network 213 to initially position the range gate as explained hereinbefore.

The second control signal which is provided to the addressing unit 211 from the synchronizer 217 is effective, depending upon its level, to cause the former to enable either the PRI register 207 or the offset PRI register 209. Thus, if such signal is at the "logical 0" level, the addressing unit 211 enables the PRI register 207, and, conversely, if the control signal is at the "logical 1" level, the offset PRI register 209 is enabled. Once the PRI register 207 is enabled, the binary word representing the selected PRI is transferred to the PRI counter 203. The latter then produces a pulse train waveform, shown on FIG. 3B, having a width of 20 nanoseconds, whose period is equal to the PRI. Such pulse train waveform is applied both to the synchronizer 217 and to the range gate shaping network 213 wherein it is effective to cause a new range gate control signal to be generated during each successive PRI.

As mentioned hereinabove, both the pulse train from the time mark counter 201 shown in FIG. 3A and that from the PRI counter 203 shown in FIG. 3B are applied to the synchronizer 217. The latter is shown to include a pair of J-K flip/flops 219, 221 and an AND gate 223. The output of the time mark counter 201 is shown to be applied directly to the J input and via an inverter 220 to the K input of J-K flip/flop 219. Both J-K flip/flops 219 and 221 are shown to be clocked by the output of the PRI counter 203. With a "logical 1" present at the J input and a "logical 0" present at the K input of the J-K flip/flop 219 the noninverted (Q) output will go high (to a "logical 1") upon receipt of the rising edge of the next clock pulse. The noninverted (Q) output from J-K flip/flop 219 will remain at the "logical 1" level until the J-K inputs are reversed and the rising edge of the next clock pulse is received. This action results in the waveform shown in FIG. 3C. The noninverted (Q) output from J-K flip/flop 219 is provided (a) as an input signal to the J terminal of J-K flip/flop 221, and (b) as a first input signal to AND gate 223. It will now be appreciated that when the noninverted (Q) output from J-K flip-flop 219 goes to a "logical 1" the inverted ($\overline{Q}$) output from that device will go to the "logical 0" level. As the outputs of the J-K flip/flop 219 are provided as the J and K inputs, respectively, to the J-K flip/flop 221, on the rising edge of the next clock pulse the noninverted (Q) output of J-K flip/flop 221, which is provided as the second input to AND gate 223, will switch from a "logical 1" to a "logical 0", thereby producing the waveform shown in FIG. 3D. From the foregoing it may now be seen that when the noninverted (Q) output from J-K flip/flop 219 goes to the "logical 1" level the output from AND gate 223 also goes to the "logical 1" level and remains in that state until the inverted (Q) output from J-K flip/flop 221 switches from a "logical 1" to a "logical 0". As the time interval between the time the noninverted (Q) output from J-K flip/flop 219 switches from a "logical 0" to a "logical 1" and the inverted ($\overline{Q}$) output from J-K flip/flop 221 switches from a "logical 1" to a "logical 0" is controlled by the time between the rising edges of subsequent clock pulses, which is here equal to the PRI, the output from AND gate 223 is a pulse whose width is equal to the PRI, as shown in FIG. 3E.

The output of the AND gate 223 which is also the output of the synchronizer 217 is passed to the addressing unit 211. As mentioned hereinabove, when the output signal from the synchronizer 217 is a "logical 1" it causes the addrressing unit 211 to enable the offset PRI register 209. When that register is enabled a binary word representing either the PRI plus 20 nanoseconds or the PRI minus 20 nanoseconds is supplied to the PRI counter 203. As the output of the synchronizer 217 has a pulse width equal to the PRI, the offset PRI register 209 is enabled for only one PRI.

Figure 4:
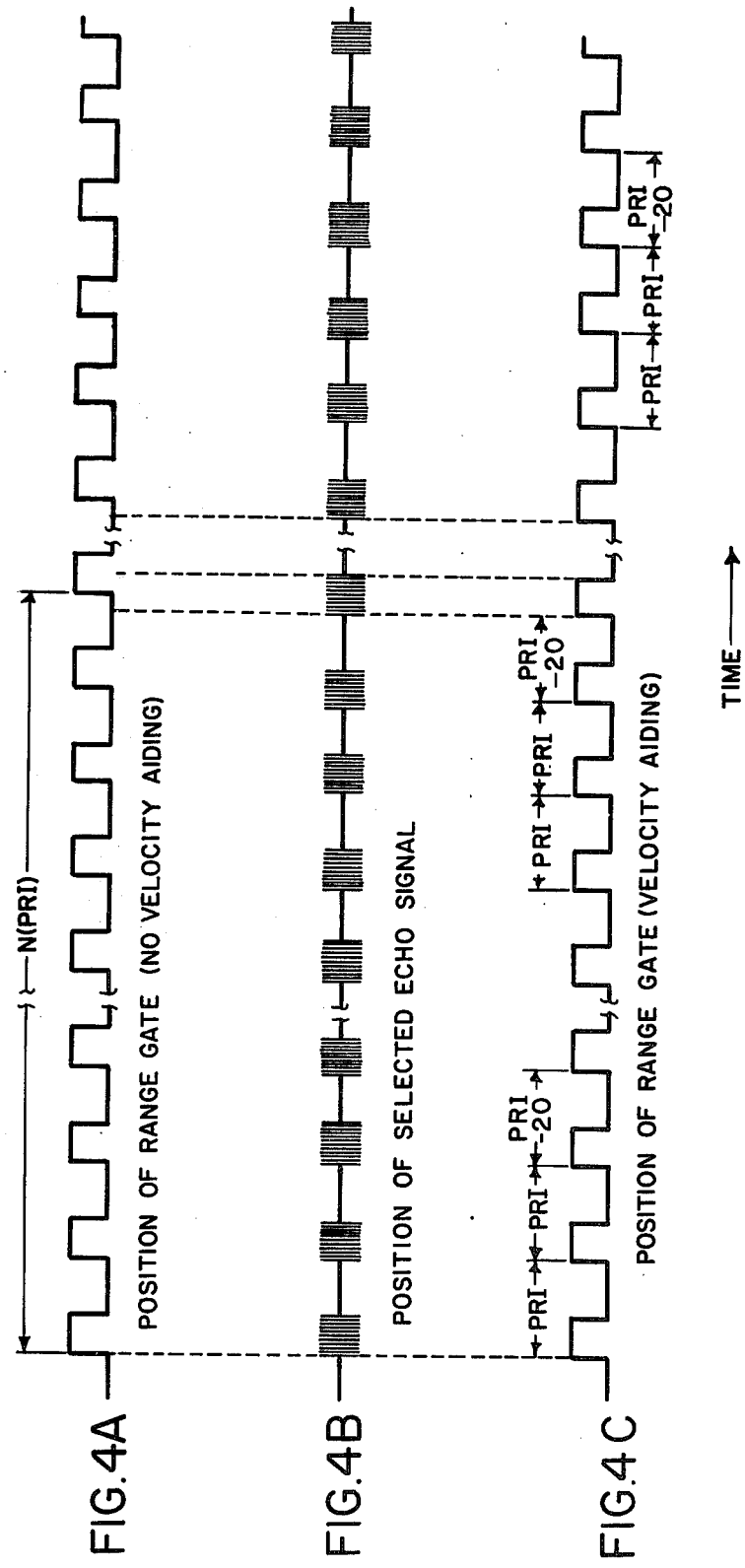
FIGS. 4A, 4B, 4C and 5 are diagrams useful in understanding the operation of the range gate generator of FIG. 2.

Referring now to FIGS. 4A through 4C, the effects of three velocity aiding increments to position a range gate for an approaching target are illustrated. Thus, FIG. 4A illustrates the positioning in successive sweeps of a nonvelocity aided range gate, while FIG. 4B illustrates the position of echo signals from an approaching target. It may be seen that, after a time of N(PRI) has elapsed (where N is an integer) the time of arrival of the echo signals (relative to the range gates) changes until the echo signals are lost. FIG. 4C illustrates how velocity aiding is effective to maintain echo signals centered within the range gates. Thus, when the PRI register 207 (FIG. 2) is enabled and the PRI word is loaded into the range gate shaping network 213 (FIG. 2) the output of the latter yields a waveform with a period equal to the PRI. When the offset PRI register 209 (FIG. 2) is enabled, a binary word representing PRI minus 20 nanoseconds is loaded into the range gate shaping network 213 (FIG. 2) and the resultant output from the latter occurs at a period of PRI-20 nanoseconds. This change in the output period, occurring at the end of each velocity aiding estimate time interval, is the range gate slip. If the target were receding, the binary word representing PRI+20 nanoseconds would be in the offset PRI register 209 (FIG. 2) and the PRI would be increased by 20 nanoseconds after each velocity aiding time interval.

Figure 5:
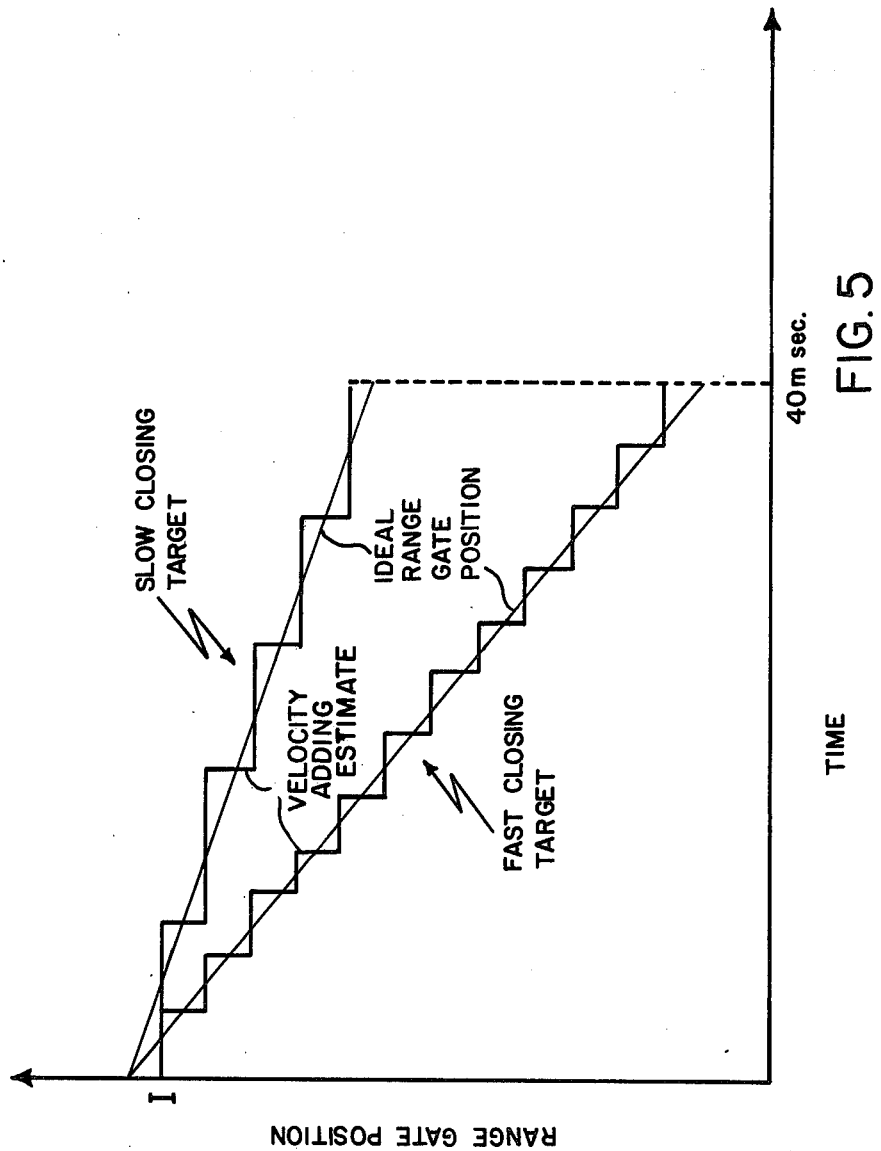

Referring now to FIG. 5, at each update of the digital computer 115 (FIG. 1) the range gate is shown to be initially positioned at "I" by the RANGE ESTIMATE word provided by the digital computer 115 (FIG. 1) to range estimate register 205 (FIG. 2). The VELOCITY AIDING ESTIMATE time, which as noted hereinbefore is a binary word derived by the digital computer 115 (FIG. 1) representative of the missile-to-target closing velocity, is counted out by the time mark counter 201 (FIG. 2), ultimately to cause the range gate to be advanced. The interval between advances is equal to the width of the steps (not numbered) shown for both slow and fast closing targets. As indicated, the range gate is advanced 20 nanoseconds as illustrated by the height of the steps (not numbered) for both the slow and fast targets, but the interval between successive advances is determined by the Doppler velocity of the target. The process continues until the digital computer 115 (FIG. 1) provides a new VELOCITY AIDING ESTIMATE to the time mark counter 201 (FIG. 2) at the end of the computer update time which is here shown to be 40 milliseconds. The diagonal lines illustrate ideal velocity aiding for slow and fast targets wherein the range gate is continually advanced to maintain correlation between the range gate and the echo signals from a target. It will now be appreciated that the digital velocity aiding technique herein described closely approximates the ideal system.

Having described a preferred embodiment of this invention, it is evident that other embodiments incorporating its concepts will become readily apparent to one of skill in the art. For example, it will be obvious that the magnitude of the range gate slip (here 20 nanoseconds) may be changed. It will also be obvious that, so long as the underlying method of the invention, i.e. providing a way to adjust the position of a range gate to compensate for the Doppler velocity of a selected target by utilizing digital components, is followed, the elements making up the invention may be changed as desired. Thus, known early/late range gates may be generated in any known manner along with the range gate illustrated hereinbefore.

What is claimed is:

1. In a pulse radar system adapted to track a selected target, such system including the combination of a radar transmitter, a radar receiver and a computer periodically to provide signals representative of (1) the range of the selected target, (2) the magnitude of the Doppler velocity of the selected target, (3) the sense of such Doppler velocity and (4) the pulse repetition interval between successive pulses transmitted by the radar transmitter, a controller for actuating a range gate generator in the radar receiver to maintain the echo signal from the selected target within a range gate, such controller comprising:
    (a) first means for storing the signals representative of the range of the selected target, the magnitude of the Doppler velocity of the selected target, the sense of the Doppler velocity of the selected target and the pulse repetition interval between successive pulses transmitted by the radar transmitter;
    (b) second means, responsive alternatively to the stored signals representative of the range of the selected target, the pulse repetition interval between successive pulses transmitted by the radar transmitter and the sense of the Doppler velocity of the selected target, for actuating the range gate generator after each one of the successive pulses transmitted by the radar transmitter in accordance with the selected signal;
    (c) third means for periodically selecting first the stored signal representative of the range of the selected target to actuate the range gate generator a single time;
    (d) fourth means for then selecting the stored signal representative of the pulse repetition interval between successive pulses transmitted by the radar transmitter to actuate the range gate generator after each one of a plurality of pulses successively transmitted by the radar transmitter;
    (e) fifth means, responsive to the stored signals representative of the Doppler velocity of the selected target and to the pulse repetition interval between successive pulses transmitted by the radar transmitter, for determining the number of pulses in the foregoing plurality of pulses, for selecting the stored signal representative of the sense of the Doppler velocity of the selected target to actuate the range gate generator after the next successive pulse transmitted by the radar transmitter; and
    (f) sixth means for repetitively actuating the fourth and fifth means until the third means is again actuated.

2. In an active missile seeker including a solid state transmitter for producing a pulse train waveform as a source of radar signals to be directed toward a moving target, a receiver/signal processor, including a bank of range gates, for processing the radar echo signals received from the target, and a digital computer responsive to the processed echo signals from the receiver/processor for developing guidance command signals to guide the missile to the moving target, an improved range gate generator for centering said target echo signals within said range gates, such improvement comprising:
    (a) register means comprising a plurality of storage elements for storing binary words received from the digital computer representing, respectively, the estimated range to the target, the pulse repetition interval, and either the pulse repetition interval minus 20 nanoseconds indicating that the target is approaching or the pulse repetition interval plus 20 nanoseconds indicating that the target is receding;
    (b) first counter means, coupled to said register means, for counting a selected one of the binary words from said register means;
    (c) means, responsive to said first counter means, for generating control signals for positioning said range gates in accordance with the selected word from said register means;
    (d) second counter means for counting a binary word provided by the digital computer representing an estimate of the missile to target closing velocity;
    (e) means for synchronizing the outputs of said first and second counter means; and
    (f) addressing means, responsive to said synchronizing means, for controlling which binary word from said register means will be passed to said first counter means.

3. The improved range gate generator as recited in claim 2 wherein said synchronizing means comprises: a first and second flip/flop and an AND gate wherein the noninverting output of said first flip/flop and the inverting output of said second flip/flop are combined in said AND gate and said first flip/flop is responsive to the output signals provided by said second counter means to provide control signals to said second flip/flop.

4. The improved range gate generator as recited in claim 3 wherein said first and second flip/flops are clocked by the output signals provided by said first counter means.

5. In the operation of a guided missile in flight, such missile carrying the combination of a pulse radar and a digittal computer to derive digital signals representative of (a) the range of a selected target, (b) the magnitude of the Doppler velocity of the selected target, (c) the sense of such Doppler velocity, and (d) the pulse repetition interval between successive pulses transmitted by the pulse radar, the method of generating a range gate at a time after each pulse transmitted by the pulse radar to maintain each echo signal from the selected target with the range gate, such method comprising the steps of:
    (a) firstly, generating, after a first pulse in a set of N pulses transmitted by the pulse radar, a first range gate positioned in accordance with the digital signal representative of the range of the selected target to cause the echo signal then returned from such target to fall within such range gate;
    (b) secondly, repetitively generating, in accordance with the digital signals representative of the magnitude of the Doppler velocity of the selected target and the pulse repetition interval between successive pulses transmitted by the pulse radar, a control signal having a first and a second state, the duration of the first state being equal to M pulse repetition intervals, where "M" is less than "N/2" and the second state has a duration equal to a pulse repetition interval;

(c) thirdly, when the control signal is in its first state, generating, after each successive pulse then transmitted by the pulse radar, a range gate at the same relative position as the first range gate; and (d) fourthly, when the control signal is in its second state, generating, after the pulse then transmitted by the pulse radar, a range gate displaced in accordance with the digital signal representative of the sense of the Doppler velocity of the selected target from the position of the first range gate.

6. The method as in claim 5 wherein the displacement of the range gate generated when the control signal is in its second state is independent of the digital signal representative of the magnitude of the Doppler velocity of the selected target.

7. The method as in claim 6 having, additionally, the step of generating, after each successive set of N pulses has been transmitted, a recycling control signal whereby the steps of the method are repeated.

* * * * *